(12) United States Patent
Giuliano et al.

(10) Patent No.: US 9,847,715 B2
(45) Date of Patent: *Dec. 19, 2017

(54) SWITCHED-CAPACITOR CONVERTERS WITH LOW-VOLTAGE GATE DRIVERS

(71) Applicant: Peregrine Semiconductor Corporation, San Diego, CA (US)

(72) Inventors: David Giuliano, Brookline, MA (US); Gregory Szczeszynski, Hollis, NH (US); Raymond Barrett, Jr., Merrimack, NH (US)

(73) Assignee: Peregrine Semiconductor Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,935

(22) Filed: Sep. 22, 2016

(65) Prior Publication Data

US 2017/0170725 A1 Jun. 15, 2017

Related U.S. Application Data

(63) Continuation of application No. 14/276,426, filed on May 13, 2014, now Pat. No. 9,502,968, which is a (Continued)

(51) Int. Cl.
*H02M 3/07* (2006.01)
*H02M 1/088* (2006.01)

(52) U.S. Cl.
CPC ............. *H02M 3/07* (2013.01); *H02M 1/088* (2013.01); *H02M 3/073* (2013.01)

(58) Field of Classification Search
CPC .................................. H02M 3/07; H02M 3/073
See application file for complete search history.

(56) References Cited

U.S. PATENT DOCUMENTS

| 4,214,174 A | 7/1980 | Dickson |
| 4,812,961 A | 3/1989 | Essaff et al. |

(Continued)

FOREIGN PATENT DOCUMENTS

| JP | 10327573 | 12/1998 |
| JP | 11235053 | 8/1999 |

(Continued)

OTHER PUBLICATIONS

O. Abutbul et al. "Step-Up Switching-Mode Converter With High Voltage Gain Using a Switched-Capacitor Circuit" *IEEE Transactions on Circuits and Systems I.*, vol. 50, pp. 1098-1102, Aug. 2003.

(Continued)

*Primary Examiner* — Jue Zhang
*Assistant Examiner* — Lakaisha Jackson
(74) *Attorney, Agent, or Firm* — Occhiuti & Rohlicek LLP

(57) ABSTRACT

A power-conversion apparatus includes active-semiconductor switches configured to transition between first and second states that result in corresponding first and second electrical interconnections between capacitors and at least one of first and second terminals configured to be coupled to first and second external circuits at corresponding first and second voltages, a pre-charge circuit coupled to at least one of the capacitors, and gate-driver circuits, each of which includes a control input, power connections, and a drive output. Each switch is coupled to and controlled by a drive output of one of the gate-driver circuits. Power for the gate-driver circuits comes from charge stored on at least one of the capacitors via the power connection of that gate-driver circuit.

28 Claims, 10 Drawing Sheets

Related U.S. Application Data continuation of application No. 13/837,796, filed on Mar. 15, 2013, now Pat. No. 8,724,353.

(56) References Cited

U.S. PATENT DOCUMENTS

| | | | |
|---|---|---|---|
| 5,132,606 | A | 7/1992 | Herbert |
| 5,301,097 | A | 4/1994 | McDaniel |
| 5,737,201 | A | 4/1998 | Meynard et al. |
| 5,761,058 | A | 6/1998 | Kanda et al. |
| 5,801,987 | A | 9/1998 | Dinh |
| 5,907,484 | A | 5/1999 | Kowshik et al. |
| 5,978,283 | A | 11/1999 | Hsu et al. |
| 6,107,864 | A | 8/2000 | Fukushima et al. |
| 6,476,666 | B1 | 11/2002 | Palusa et al. |
| 6,486,728 | B2 | 11/2002 | Kleveland |
| 6,501,325 | B1 | 12/2002 | Meng |
| 6,504,422 | B1 | 1/2003 | Rader et al. |
| 6,759,766 | B2 | 7/2004 | Hiratsuka et al. |
| 6,927,441 | B2 | 8/2005 | Pappalardo et al. |
| 6,980,181 | B2 | 12/2005 | Sudo |
| 7,145,382 | B2 | 12/2006 | Ker et al. |
| 7,190,210 | B2 | 3/2007 | Azrai et al. |
| 7,224,062 | B2 | 5/2007 | Hsu |
| 7,239,194 | B2 | 7/2007 | Azrai et al. |
| 7,250,810 | B1 | 7/2007 | Tsen |
| 7,408,330 | B2 | 8/2008 | Zhao |
| 7,511,978 | B2 | 3/2009 | Chen et al. |
| 7,595,682 | B2 | 9/2009 | Lin et al. |
| 7,595,683 | B1 * | 9/2009 | Floyd .................. H02M 3/073 327/536 |
| 7,724,551 | B2 | 5/2010 | Yanagida et al. |
| 7,777,459 | B2 | 8/2010 | Williams |
| 7,782,027 | B2 | 8/2010 | Williams |
| 7,786,712 | B2 | 8/2010 | Williams |
| 7,807,499 | B2 | 10/2010 | Nishizawa |
| 7,812,579 | B2 | 10/2010 | Williams |
| 7,928,705 | B2 | 4/2011 | Hooijschuur et al. |
| 7,999,601 | B2 | 8/2011 | Schlueter et al. |
| 8,018,216 | B2 | 9/2011 | Kakehi |
| 8,040,174 | B2 | 10/2011 | Likhterov |
| 8,048,766 | B2 | 11/2011 | Joly et al. |
| 8,111,054 | B2 | 2/2012 | Yen et al. |
| 8,159,091 | B2 | 4/2012 | Yeates |
| 8,193,604 | B2 | 6/2012 | Lin et al. |
| 8,212,541 | B2 | 7/2012 | Perreault et al. |
| 8,339,184 | B2 * | 12/2012 | Kok .................... H03K 17/687 327/536 |
| 8,350,549 | B2 | 1/2013 | Kitabatake |
| 8,384,467 | B1 | 2/2013 | O'Keeffe et al. |
| 8,395,914 | B2 | 3/2013 | Klootwijk et al. |
| 8,456,874 | B2 | 6/2013 | Singer et al. |
| 8,503,203 | B1 | 8/2013 | Szczeszynski et al. |
| 8,619,445 | B1 * | 12/2013 | Low ...................... H02M 1/32 363/59 |
| 8,817,501 | B1 * | 8/2014 | Low ...................... H02M 3/07 363/59 |
| 8,981,836 | B2 * | 3/2015 | Kern .................... H03L 7/0895 327/536 |
| 2003/0169096 | A1 | 9/2003 | Hsu et al. |
| 2003/0227280 | A1 | 12/2003 | Vinciarelli |
| 2004/0041620 | A1 | 3/2004 | D'Angelo et al. |
| 2005/0007184 | A1 | 1/2005 | Kamijo |
| 2005/0207133 | A1 | 9/2005 | Pavier et al. |
| 2007/0210774 | A1 | 9/2007 | Kimura et al. |
| 2007/0230221 | A1 | 10/2007 | Lim et al. |
| 2008/0150621 | A1 | 6/2008 | Lesso et al. |
| 2008/0157732 | A1 | 7/2008 | Williams |
| 2008/0157733 | A1 | 7/2008 | Williams |
| 2008/0186081 | A1 | 8/2008 | Yamahira et al. |
| 2008/0239772 | A1 | 10/2008 | Oraw et al. |
| 2009/0072800 | A1 * | 3/2009 | Ramadass ............ H02M 3/07 323/271 |
| 2009/0102439 | A1 | 4/2009 | Williams |
| 2009/0257211 | A1 | 10/2009 | Kontani et al. |
| 2009/0278520 | A1 | 11/2009 | Perreault et al. |
| 2010/0110741 | A1 | 5/2010 | Lin et al. |
| 2010/0117719 | A1 * | 5/2010 | Matano ................ H02M 3/073 327/536 |
| 2010/0140736 | A1 | 6/2010 | Lin et al. |
| 2010/0202161 | A1 | 8/2010 | Sims et al. |
| 2010/0214746 | A1 | 8/2010 | Lotfi et al. |
| 2010/0244189 | A1 | 9/2010 | Klootwijk et al. |
| 2010/0244585 | A1 | 9/2010 | Tan et al. |
| 2011/0101938 | A1 | 5/2011 | Ma et al. |
| 2011/0163414 | A1 | 7/2011 | Lin et al. |
| 2012/0146177 | A1 | 6/2012 | Choi et al. |
| 2012/0313602 | A1 | 12/2012 | Perreault et al. |
| 2012/0326684 | A1 | 12/2012 | Perreault et al. |
| 2013/0049714 | A1 | 2/2013 | Chiu |
| 2013/0094157 | A1 | 4/2013 | Giuliano |
| 2013/0154600 | A1 | 6/2013 | Giuliano |
| 2013/0229841 | A1 | 9/2013 | Giuliano |
| 2014/0091773 | A1 * | 4/2014 | Burlingame ........... H02M 3/07 323/271 |

FOREIGN PATENT DOCUMENTS

| | | |
|---|---|---|
| JP | 2003284324 | 10/2003 |
| JP | 2010045943 A | 2/2010 |
| KR | 10-2010-0138146 | 12/2010 |
| WO | 2006093600 | 9/2006 |
| WO | 2009112900 | 9/2009 |
| WO | 2011089483 | 7/2011 |
| WO | 2012151466 | 11/2012 |
| WO | 2013059446 | 4/2013 |
| WO | 2013096416 | 6/2013 |

OTHER PUBLICATIONS

Umeno et al. "A New Approach to Low Ripple-Noise Switching Converters on the Basis of Switched-Capacitor Converters" *IEEE International Symposium on Circuits and Systems*, vol. 2, pp. 1077-1080, Jun. 1991.

Axelrod et al. "Single-switch single-stage switched-capacitor buck converter", *Proc. of NORPIE 2004, 4th Nordic Workshop on Power and Industrial Electronics*, Jun. 2004, entire document, pp. 1-5 of pdf submission.

Sun et al. "High Power Density, High Efficiency System Two-Stage Power Architecture for Laptop Computers", *Power Electronics Specialists Conference*, pp. 1-7, Jun. 2006.

R. D. Middlebrook, "Transformerless DC-to-DC Converters with Large Conversion Ratios" *IEEE Transactions on Power Electronics*, vol. 3, No. 4, pp. 484-488, Oct. 1988.

Wood et al, "Design, Fabrication and Initial Results of a 2g Autonomous Glider" *IEEE Industrial Electronics Society*, pp. 1870-1877, Nov. 2005.

T. A. Meynard, H. Foch, "Multi-Level Conversion: High Voltage Choppers and Voltage-Source Inverters," *IEEE Power Electronics Specialists Conference*, pp. 397-403, 1992.

Pilawa-Podgurski et al. "Merged Two-Stage Power Converter Architecture with Soft Charging Switched-Capacitor Energy Transfer" *39th IEEE Power Electronics Specialists Conference*, 2008, pp. 4008-4015.

Han et al. "A New Approach to Reducing Output Ripple in Switched-Capacitor-Based Step-Down DC-DC Converters" *IEEE Transactions on Power Electronics*, vol. 21, No. 6, pp. 1548-1555 Nov. 2006.

Lei et al. "Analysis of Switched-capacitor DC-DC Converters in Soft-charging Operation" *14th IEEE Workshop on Control and Modeling for Power Electronics*, pp. 1-7, Jun. 23, 2013.

Ng et al. "Switched Capacitor DC-DC Converter: Superior where the Buck Converter has Dominated" *PhD Thesis, UC Berkeley*, Aug. 17, 2011, entire document, pp. 1-141 of pdf submission.

R. Pilawa-Podgurski and D. Perreault, "Merged Two-Stage Power Converter with Soft Charging Switched-Capacitor Stage in 180 nm

(56) References Cited

OTHER PUBLICATIONS

CMOS," *IEEE Journal of Solid-State Circuits*, vol. 47, No. 7, pp. 1557-1567, Jul. 2012.

* cited by examiner

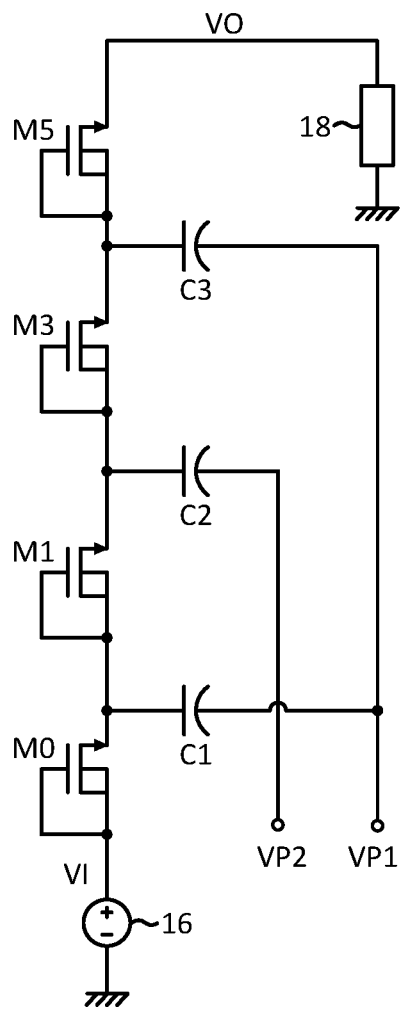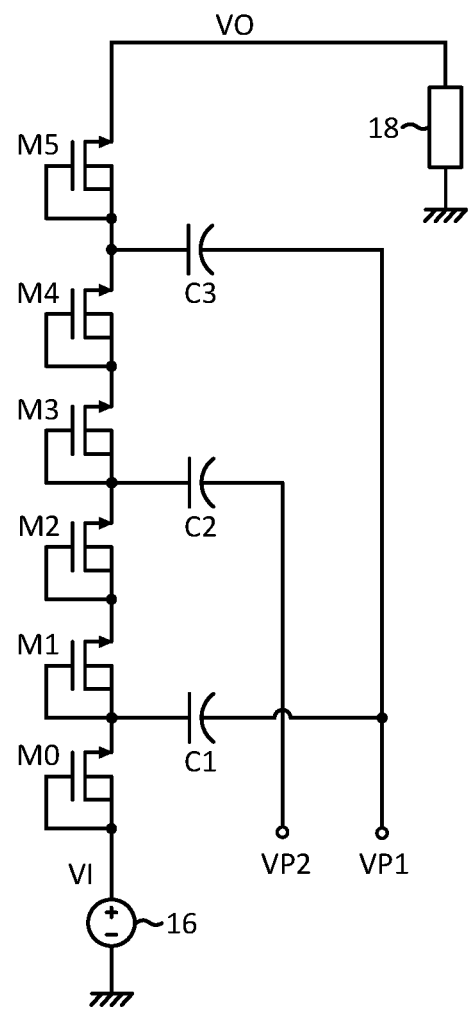
*FIG. 1*
(Prior Art)
*FIG. 2*
(Prior Art)

SWITCHED-CAPACITOR CONVERTERS WITH LOW-VOLTAGE GATE DRIVERS

RELATED APPLICATIONS

This application is a continuation of U.S. application Ser. No. 14/276,426, filed on May 13, 2014 which is a continuation of U.S. application Ser. No. 13/837,796, filed on Mar. 15, 2013, now U.S. Pat. No. 8,724,353, issued on May 13, 2014 the contents of which are hereby incorporated by reference in their entirety.

FIELD OF INVENTION

This invention relates to switched capacitor converters, and more particularly to pre-charging such converters.

BACKGROUND

A switch-mode power converter is a power converter that produces an output voltage by using a switch network to switch energy-storage elements into different electrical configurations. Examples of energy-storage elements include inductors and capacitors. A switched-capacitor power converter is a type of switch-mode power converter that primarily utilizes capacitors to transfer energy. In such converters, the number of capacitors and switches increases as the conversion gain increases.

As used herein, "conversion gain" is either a voltage gain or a current gain. In those cases in which the switched-capacitor power converter produces an output voltage that is larger than its input voltage, the conversion gain is a voltage gain. On the other hand, in those cases in which the switched-capacitor power converter produces an output voltage that is smaller than the input voltage, the conversion gain is a current gain.

FIGS. 1 and 2 show two examples of switched-capacitor power converters that receive an input voltage VI from a voltage source 16 and provide an output voltage VO to a load 18. Both of the examples are also known as "cascade multipliers." In FIG. 2, a number of the switching devices of the circuit in FIG. 1 have been replaced with series of multiple devices. This reducing the maximum voltage across individual devices in the circuit.

In normal operation, charging or discharging pump capacitors C1-C3 pumps charge along a chain of diode-connected NMOS transistors M0-M5. The phase voltages VP1, VP2 are one hundred and eighty degrees out of phase. Each of the NMOS transistors M0-M5 is diode-connected, thereby only permitting boost operation (i.e., VO greater than VI). Additionally, the efficiency is severely impacted because a significant amount of voltage is dropped across each of the transistors M0-M5 during normal operation. Therefore, there is a desire to operate the NMOS transistors M0-M5 in their ohmic region. But due to difficulty and/or complexity of driving the transistors M0-M5, a combination of both PMOS transistors and high-voltage transistors is typically used.

If the transistors in the switched capacitor power converter are integrated on a single substrate, it is desirable to use as few different types of devices as possible. This is because, for a given semiconductor process, cost is related to the number of mask layers. As the number of different types of devices in a semiconductor process increases so does the number of mask layers, and hence the cost.

Furthermore, it is well-known that electrons have a higher mobility than holes in silicon. Consequently, an NMOS device with a given on-resistance has a smaller gate capacitance than a PMOS device with the same on-resistance. It is also true that an NMOS device with a given gate capacitance has a smaller on-resistance than a PMOS device with the same gate capacitance. In a power converter, it is therefore desirable to replace as many PMOS devices in the main power path with NMOS devices and also to replace as many high-voltage devices with low-voltage devices.

SUMMARY

In one aspect, the invention features a power-conversion apparatus having active-semiconductor switches configured to transition between first and second states that result in corresponding first and second electrical interconnections between capacitors and at least one of first and second terminals configured to be coupled to first and second external circuits at corresponding first and second voltages, a pre-charge circuit coupled to at least one of the capacitors, and gate-driver circuits, each of which includes a control input, power connections, and a drive output. Each switch is coupled to and controlled by a drive output of one of the gate-driver circuits. Power for the gate-driver circuits comes from charge stored on at least one of the capacitors via the power connection of that gate-driver circuit.

In some embodiments, the pre-charge circuit initializes voltages on capacitors in the switched-capacitor network prior to clocked operation of a switched-capacitor network defined by the capacitors and the switches. In others, it maintains source voltages across selected switches within a required limit during startup of operation of the apparatus. In yet others, it provides charge to one or more of the capacitors to be used to power the gate driving circuits upon beginning clocked operation of the apparatus.

Among the embodiments are those in which the pre-charge circuit includes bias resistors that define a resistor divider that defines a pre-charge voltage for one or more of the capacitors during startup of operation of the apparatus. The resistances of these resistors avoids exposing the switches to voltages in excess of a threshold voltage, thereby avoiding damage to the switches during startup of operation of the apparatus.

Some embodiments include terminals coupled to the switches for connecting to the capacitors.

In other embodiments, the switches and the capacitors define a power converter that is configured to provide time-varying voltages to at least some of the gate-driver circuits.

Also among the embodiments are those in which each of the switches has a maximum-voltage rating that is less than the first voltage and those in which the voltage across the power connections of the first gate-driver circuit is no greater than twice the second voltage and less than the first voltage.

In some embodiments, each switch is driven by a corresponding one of the gate-driver circuits. These embodiments include a second gate-driver circuit that receives power via a power connection thereof from at least another of the capacitors that has a voltage across it that differs from that across the capacitor that drives the first gate-driver circuit.

In other embodiments, the capacitors include first and second capacitors connected by at least one of the switches at corresponding high-voltage terminals thereof. Among these embodiments are those in which low-voltage terminals of the capacitors are connected to different phase voltages.

In some embodiments, the first gate-driver circuit causes a voltage across the power connections thereof to be less than the first voltage.

In another aspect, the invention features a voltage-conversion apparatus that has first and second terminals that are configured for coupling to corresponding first and second external circuits at corresponding first and second voltages. A plurality of switches thereof includes switches that transition between successive states, each state being characterized by a switch-activation pattern that defines which switches are to be opened and which switches are to be closed during the state. These successive states define successive switched-capacitor networks. A transition from one successive state to the next results in dismantling of a switched-capacitor network and construction of a new switched-capacitor network. In operation, the successive switched-capacitor networks and the first and second terminals collectively define a switched-capacitor converter. At least some of the capacitors in the switched-capacitor networks connect to a pre-charge circuit. The switches are controlled by gate-driver circuits, each of which includes power connections, a control input, and a drive output coupled to and for control of at least one switch. Each gate-drive circuit is configured to be powered via its corresponding first and second power connections.

Embodiments include those in which each switch has a maximum voltage rating that is less than the higher of the first and second voltages.

In other embodiments, a voltage across first and second power connections of a first gate-driver circuit is less than or equal to twice the lower of the first and second voltages.

In yet other embodiments, the first power connection is coupled to one of the capacitors such that a voltage difference between the first and second power connections is less than whichever of the first and second voltage has a higher magnitude.

In still other embodiments, the switched-capacitor converter provides, to the gate-driver circuits, time-varying voltages relative to a lowest of the corresponding voltages.

In another aspect, the invention features a voltage conversion apparatus that has terminals that are configured for coupling to corresponding external circuits at corresponding voltages and active semiconducting switches that electrically interconnect capacitors to form a switched-capacitor network that is configured to transition between successive states. The apparatus includes a pre-charge circuit configured to be coupled to at least one of the capacitors. When so coupled, the switches electrically interconnect the capacitors in the successive states to one another and to the terminals. The apparatus also includes gate-drive circuits, each of which has a drive output, power connections, and a control input. Each drive output is coupled to and controls one of the switches. Among the gate-driver circuits is a first gate-driver circuit that controls a switch. This first gate-driver circuit is powered via the power connections thereof by charge stored on at least one of the capacitors. The switches and the terminals are constituents of a switched-capacitor converter.

In some embodiments, the terminals comprise capacitor terminals coupled to corresponding ones of the switches for connecting to the capacitors.

In other embodiments, the switched-capacitor converter provides, to at least some of the gate-driver circuits, time-varying voltages relative to a lowest of the corresponding voltages.

In yet other embodiments, each switch has a maximum voltage rating that is less than a highest of the corresponding voltages. Among these are embodiments in which the first gate-driver circuit includes first and second power connections. In operation, a voltage difference exists across the first and second power connections. This voltage difference arises at least in part from a capacitor that is connected to the first power connection. The voltage difference is less than or substantially equal to twice a lowest of the corresponding voltages.

Other embodiments include a second gate-driver circuit. In these embodiments, the first switch-element is driven by the first gate-driver circuit, which is powered by a first capacitor that has a first voltage. Meanwhile, the second switch-element is driven by the second gate-driver circuit, which is powered by a second capacitor that has a second voltage that differs from the first voltage.

Yet other embodiments include a phase generator having phase-generator switches. The phase generator provides a time-varying voltage level to one terminal of each of the capacitors. It also generates a voltage level for a capacitor in a first charge-transfer path using a voltage from a capacitor in a second charge-transfer path.

Other embodiments include those that have first and second switches in series. In operation, these switches transition into a state in which they permit a steady flow of charge between capacitors.

In some embodiments, each switch has a maximum voltage rating that is less than a highest of the corresponding voltages.

Also among the embodiments are those in which the switched-capacitor converter includes a cascade-multiplier network and those in which it includes a series-parallel switched-capacitor network.

Some embodiments include, among the gate-driver circuits, a first gate-driver circuit powered via power connections thereof from charge stored in a capacitor set such that a voltage across the power connections is substantially less than a highest of the corresponding voltages.

Also among the embodiments are those in which the capacitors are coupled to the switches. In such embodiments, the switches control the connections between the capacitors.

Another aspect of the invention features a method for converting a first voltage into a second voltage. Such a method includes connecting a first terminal of a switched-capacitor power converter to a first external circuit, the switched-capacitor power converter including a switched-capacitor network in which capacitors are selectively interconnected by active semiconductor-switches, connecting a second terminal of the switched-capacitor power converter to a second external circuit, before beginning normal operation of the switched-capacitor power converter, pre-charging at least one capacitor within the switched-capacitor power converter, providing first control-signals to control inputs of gate-driver circuitry of the power converter, wherein the first control-signals cause first drive-signals at corresponding drive-outputs of the gate-driver circuitry, with these first drive-signals causing active semiconductor-switches to execute a first switch-activation pattern, providing second control-signals to control inputs of the gate-driver circuitry, wherein the second control-signals cause second drive-signals at corresponding drive-outputs of the gate-driver circuitry, wherein the second drive-signals cause the active semiconductor-switches to execute a second switch-activation pattern, and providing power to the gate-driver circuitry through power connections thereof, the power being provided by capacitors from the switched-capacitor network, wherein, in the first switch-activation pattern, a first series of active semiconductor-switches connect first and second capacitors in the switched-capacitor network of the power converter so as to permit conduction current to flow between high-voltage terminals of first and second capacitors, and wherein providing the power includes causing a voltage across the power connections to be less than a highest of the first and second voltages.

Other features and advantages of the invention are apparent from the following description, and from the claims.

DESCRIPTION OF THE DRAWINGS

FIG. 1 is a schematic of a single-phase step-up cascade multiplier;

FIG. 2 is a schematic of a single-phase step-up cascade multiplier with cascoded switches;

DETAILED DESCRIPTION

1. Overview

A number of approaches are described below for use in the context of active control of switched-capacitor power converters. The approaches described either increase converter efficiency by reducing the charge deposited and discharged from the gates of control transistors, or permit the use of low-voltage transistors for switching, or both.

Generally, an approach to achieving these goals is by efficiently limiting the gate-to-source voltages though the design and powering of circuits driving the switching transistors during operation. A number of specific approaches, some of which are described below, use control circuitry for switching transistors, which couple the capacitors in the charge transfer path, that are themselves powered by capacitors in the same path, and/or by capacitors in different parallel paths in the case of multi-phase converters.

2. Single-Phase Cascade Multiplier

Figure 3:
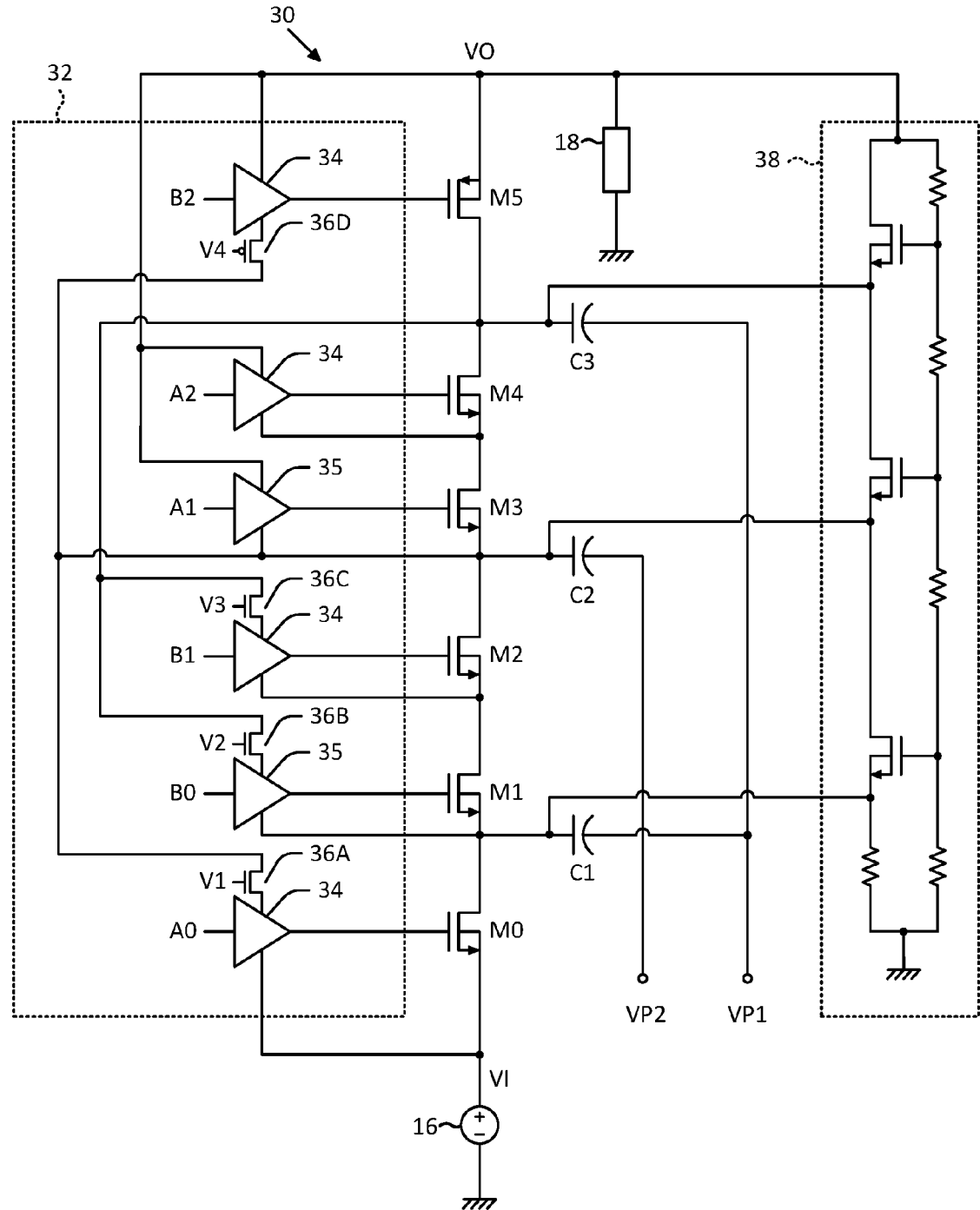
FIG. 3 is a schematic of a single-phase cascade multiplier with cascoded switches and corresponding gate drivers and a pre-charging circuit.

Referring to FIG. 3, a single-phase cascade multiplier circuit 30 makes use of transistors M0-M5 coupling to first, second, and third pump capacitors C1-C3 on the charge transfer path between a high-voltage terminal (i.e., VO) and a low-voltage terminal (i.e., VI). In the embodiment illustrated in FIG. 3, cascoded transistor switches (e.g., M1 and M2 in series) couple the pump capacitors C1-C3. However, it is also possible to use single transistors while still achieving at least some of the advantages of the configuration shown.

Each transistor is driven by a corresponding gate-driver circuit. As described in more detail below, at least some of the gate-driver circuits obtain power from the pump capacitors C1-C3 in the charge-transfer path that extends between the high-voltage terminal and the low-voltage terminal. The voltage across each of the pump capacitors C1-C3 is a fraction of the high voltage, thereby permitting efficient generation of gate-drive signals that maintain desired limits on the gate-to-source voltages of the transistors.

A driver set 32 provides the gate signals to activate or de-activate each transistor in the cascade-multiplier circuit 30. The driver set 32 includes four low-voltage gate-driver circuits 34, two high-voltage gate-driver circuits 35, and four voltage followers 36A-36D. Each gate-drive circuit receives a drive signal with a label either beginning with an "A" or a "B." The drive signals A0, B0, B1, A1, A2, B2 control transistors M0, M1, M2, M3, M4, M5, respectively. Furthermore, the voltage followers 36A-36D receive corresponding bias voltages V1-V4, respectively. A control circuit (not shown in FIG. 3) generates the drive signals A0, B0, B1, A1, A2, B2 and the bias voltages V1-V4.

The low-voltage gate-driver circuits 34 are coupled to the transistors M0, M2, M4, M5, whereas, the high-voltage gate-driver circuits 35 are coupled to the transistors M1, M3. The high-voltage gate-driver circuits 35 support twice the supply voltage of the low-voltage gate-driver circuits 34. Each of the voltage followers 36A-36D receives a voltage from one of the pump capacitors C1-C3 and provides a constant voltage to its corresponding gate-drive circuit (i.e., low-voltage gate-driver circuits 34 or high-voltage gate-driver circuits 35) that is equal to or lower in value. When the received voltage is equal to the provided voltage, the corresponding voltage follower (e.g., voltage follower 36A) behaves like a switch. To achieve this behavior, the bias voltages V1-V3 are at least a threshold voltage above the corresponding source voltage while the bias voltage V4 is at least a threshold voltage below the corresponding source voltage. Furthermore, the voltage followers 36A-36D experience the same voltage stress as the transistors M0-M5 in the cascade-multiplier circuit 30.

FIG. 3 also shows an example of a pre-charge circuit 38 that is used to initialize the voltages on the pump capacitors C1-C3 prior to clocked operation of the cascade multiplier circuit 30. By pre-charging the pump capacitors C1-C3, the drain-to-source voltages across the transistors M0-M5 within the cascade multiplier circuit 30 can be maintained within required limits during startup, and further. Additionally, the pre-charged pump capacitors C1-C3 can provide power needed by the gate driving circuits to those circuits immediately upon the start of clocked operation of the cascade multiplier circuit 30. Upon clocked operation, the pre-charge circuit 38 can be disabled.

To facilitate the use of low-voltage transistors throughout the whole power converter, the pre-charge circuit 38 uses a combination of low-voltage transistors and bias resistors. A resistor divider sets up the pre-charge voltage for each of the pump capacitors C1-C3 during startup. The source voltage of each transistor within the pre-charge circuit 38 is at least a threshold voltage below its corresponding gate voltage. As a result, none of the transistors within either the pre-charge circuit 38 or the cascade multiplier circuit 30 are exposed to voltage stresses that can damage the devices during startup or clocked operation.

Figure 4:
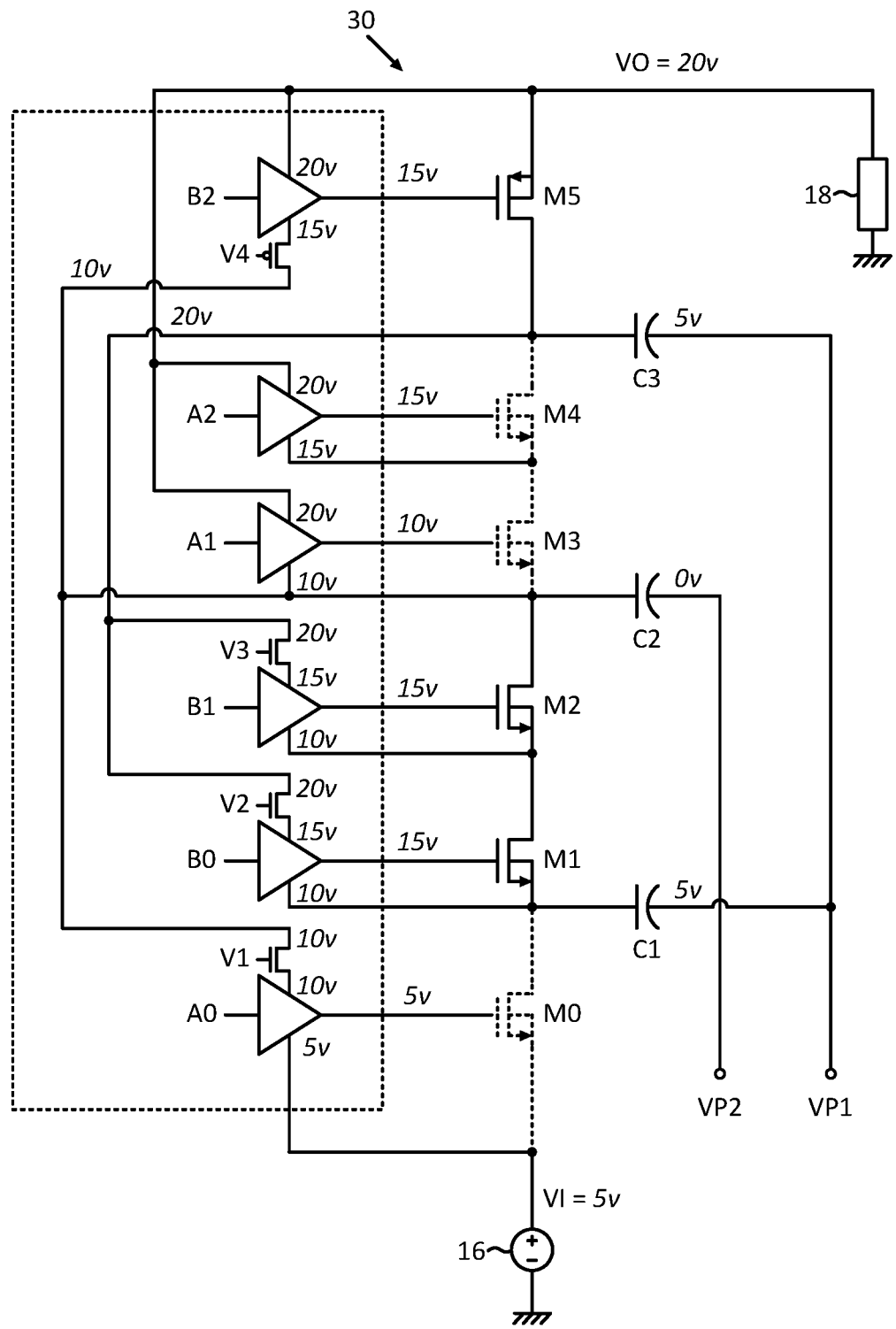
FIGS. 4-5 are annotated schematics of the circuit of FIG. 3 in first and second phases of operation, respectively.
Figure 5:
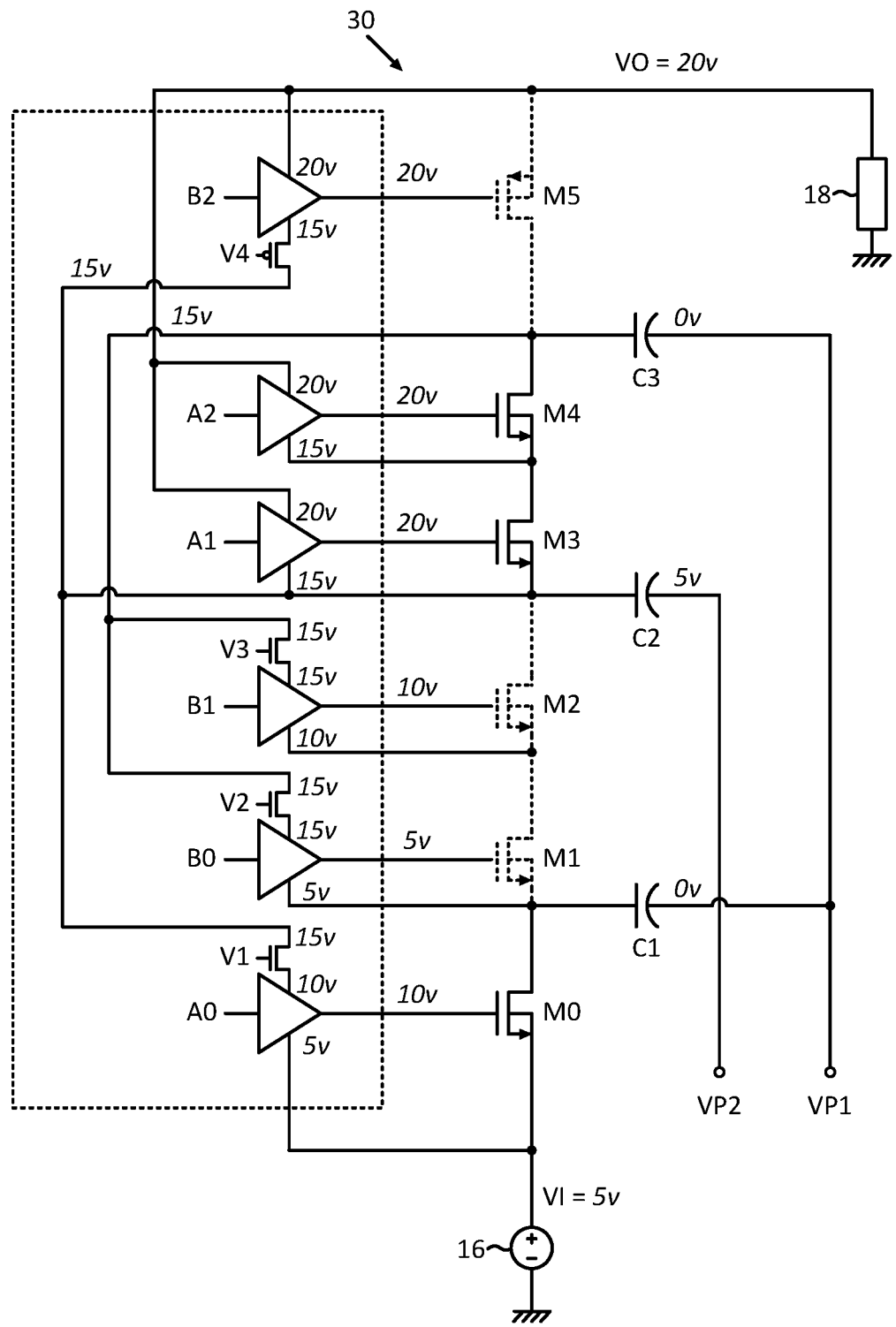

Operation of the cascade multiplier circuit 30 and the resulting voltage levels powering the gate driving circuits can be understood with reference to their two states of operation as shown in FIGS. 4-5. The cascade multiplier circuit 30 transfers energy from a source 16 to a load 18 by cycling between a first state and a second state at a specific frequency. All of the transistors coupled with the "A" signals are activated and de-activated at the same time; as is the case for all of the transistors coupled with the "B" signals. To ensure a clean transition between the first and second state, the "A" signals and "B" signals do not overlap in time. Furthermore, the first and second phase voltages VP1, VP2 are synchronized with the "A" signals and "B" signals.

Given an input voltage VI of five volts, the cascade multiplier circuit 30 produces an output voltage VO that is twenty volts. The maximum voltage across any transistor is five volts. Furthermore, the low-voltage gate driver circuits 34 support five volts while the high-voltage gate driver circuits 35 must support ten volts.

FIG. 4 illustrates a first state of operation. In this first state, the first phase voltage VP1 is at five volts while the second phase voltage VP2 is at zero volts. The gate driver circuits that receive a "B" signal activate their corresponding transistors and the gate driver circuits that receive an "A" signal de-activate their corresponding transistors. Consequently, a gate voltage of fifteen volts activates the transistors M1, M2, M5 while gate voltages of five volts, ten volts, and fifteen volts de-activate the transistors M0, M3, M4, respectively.

In the second state, shown in FIG. 5, the first phase voltage VP1 is at zero volts while the second phase voltage VP2 is at five volts. The gate driver circuits that receive an "A" signal activate their corresponding transistors and the gate driver circuits that receive a "B" signal de-activate their corresponding transistors. Consequently, gate voltages of five volts, ten volts, and twenty volts de-activate the transistors M1, M2, M5 respectively; while gate voltages of ten volts, twenty volts, and twenty volts activate the transistors M0, M3, M4, respectively.

Unfortunately, the voltage followers 36A-36D associated with the transistors M0, M1, M2, M5 consume power. Each voltage follower drops five volts across its drain and source terminals while sinking or source current for its corresponding gate driver. In the case of the transistors M1, M2, M5, this occurs during the first state while for transistor M0 this occurs during the second state.

In the cascade multiplier circuit 30, charge transfers to the load 18 from the source 16 at a rate dictated by the load 18. Because this is a single-phase design, there is only one charge transfer path that a unit of charge can follow. For example, at the start of a first clock cycle, the unit of charge leaves the source 16 and flows into the first pump capacitor C1. After a state transition, the unit of charge moves to the second pump capacitor C2. When a second clock cycle begins, the unit of charge then moves from the second pump capacitor C2 to the third pump capacitor C3. After one more state transition, the unit of charge finally reaches the load 18. It therefore takes two full clock cycles (i.e. four consecutive states) for the initial charge to reach the load 18 from the source 16.

In general, as the conversion gain of a cascade multiplier increases, the number of pump capacitors increases. Consequently, it takes a longer time for a unit of charge from the source 16 to reach the load 18 because the unit of charge needs to bounce between more pump capacitors. The number of clock cycles in the charge transfer path is M-2, where M is equal to the conversion gain. In this example, M is equal to four; therefore, the number of clock cycles is two.

Figure 6:
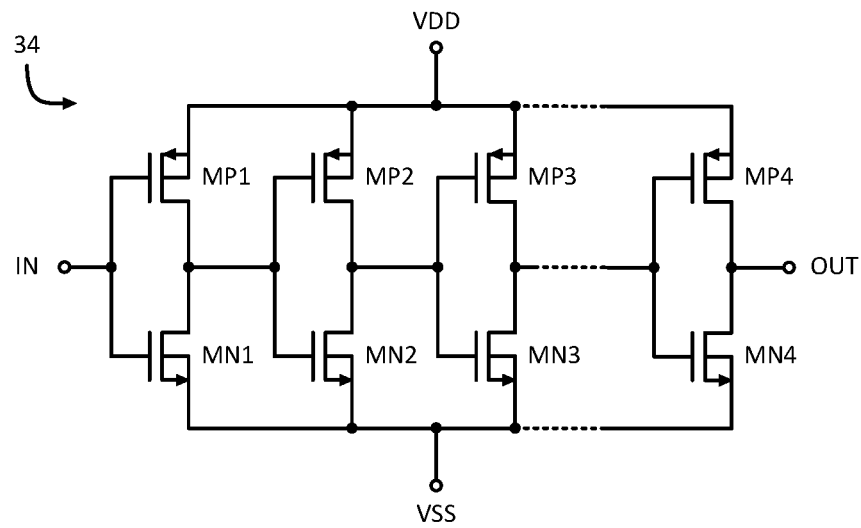
FIG. 6 is a schematic of a tapered gate driver.
Figure 7:
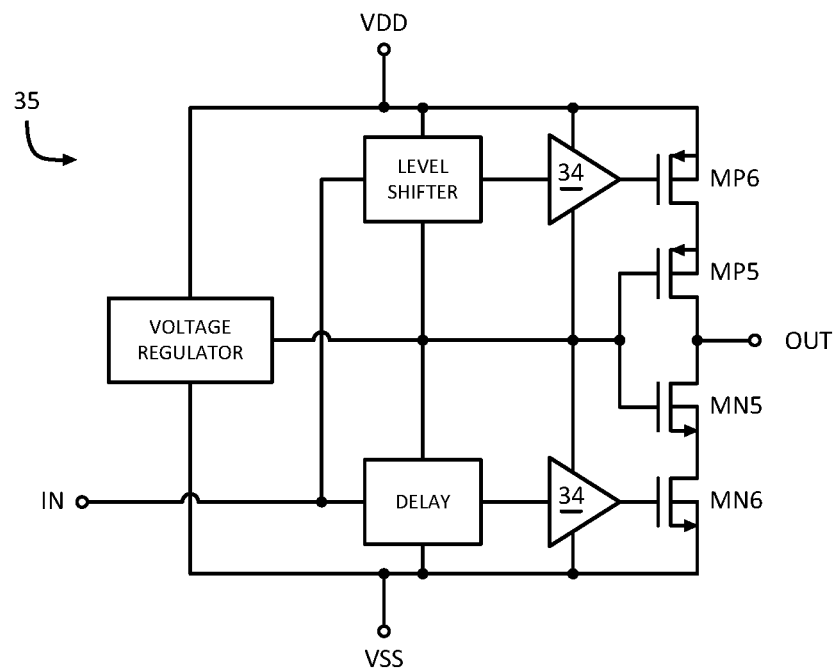
FIG. 7 is a schematic of a cascoded gate driver.

FIGS. 6-7 illustrate two alternative gate driving circuits, both of which can be used for the high-voltage gate driver circuits 35 and the low-voltage gate driver circuits 34. However, as will be made clear in the following description, the gate driver in FIG. 6 is more suitable for the low-voltage gate driver 34 while the gate driver in FIG. 7 is more suitable for the high-voltage gate driver 35.

As illustrated in FIG. 6, a tapered gate driver features an input terminal IN, an output terminal OUT, and supply terminals VDD, VSS. The input terminal IN couples with the output terminal OUT through first, second, third, and fourth inverters, in that order. The four inverters include high-side PMOS transistors MP1-MP4 and low-side NMOS transistors MN1-MN4. Due to the difference in electron and hole mobilities, each of the PMOS transistors MP1-MP4 is typically sized larger than its corresponding NMOS transistors MN1-MN4.

Starting at the input terminal IN, each subsequent inverter is k times larger than the previous inverter. For example, if k is equal to five and the width of the first inverter is one micron, then the widths of the second, third, and fourth inverters are five microns, twenty-five microns, and one hundred and twenty-five microns, respectively. By tapering the inverters, a small logic gate coupled to the input terminal IN is able to drive a large power transistor coupled to the output terminal OUT.

The maximum supply voltage of the tapered gate driver is equal to or less than the breakdown voltage of the transistors. Therefore, the tapered gate driver is a good choice for the low-voltage gate driver circuits 34 in the cascade multiplier circuit 30. Unfortunately, due to the higher voltage requirements of the high-voltage gate driver circuit 35 in FIGS. 3-5, the tapered gate driver circuit requires transistors with twice the breakdown voltage.

An alternative method of increasing the supply voltage without the need of higher voltage transistors is to use a cascoded gate driver. As illustrated in FIG. 7, a cascoded gate driver includes an input terminal IN, an output terminal OUT, and supply terminals VDD, VSS. The cascoded gate driver features an output stage that includes first and second high-side transistors MP5, MP6 and first and second low-side transistors MN5, MN6. The output stage requires additional support circuitry, such as a level shifter, two gate drivers, a delay block, and a voltage regulator, all of which can be designed using transistors with the same breakdown voltage as that of the transistors in the output stage.

During normal operation of the cascoded gate driver, the high-side transistors MP5, MP6 are activated when the low-side transistors MN5, MN6 are de-activated and vice-versa. Therefore, the cascoded gate driver can support twice the supply voltage because the differential voltage across the supply terminals VDD, VSS is always supported by two de-activated transistors. In general, a larger number of transistors can be cascoded to increase the supply voltage further. For example, if the output stage included three high-side transistors and three low-side transistors then the maximum supply voltage would be tripled and so on. Unfortunately, as the number of cascoded transistors increases, so does the complexity of the support circuitry.

3. Dual-Phase Cascade Multiplier

Figure 8:
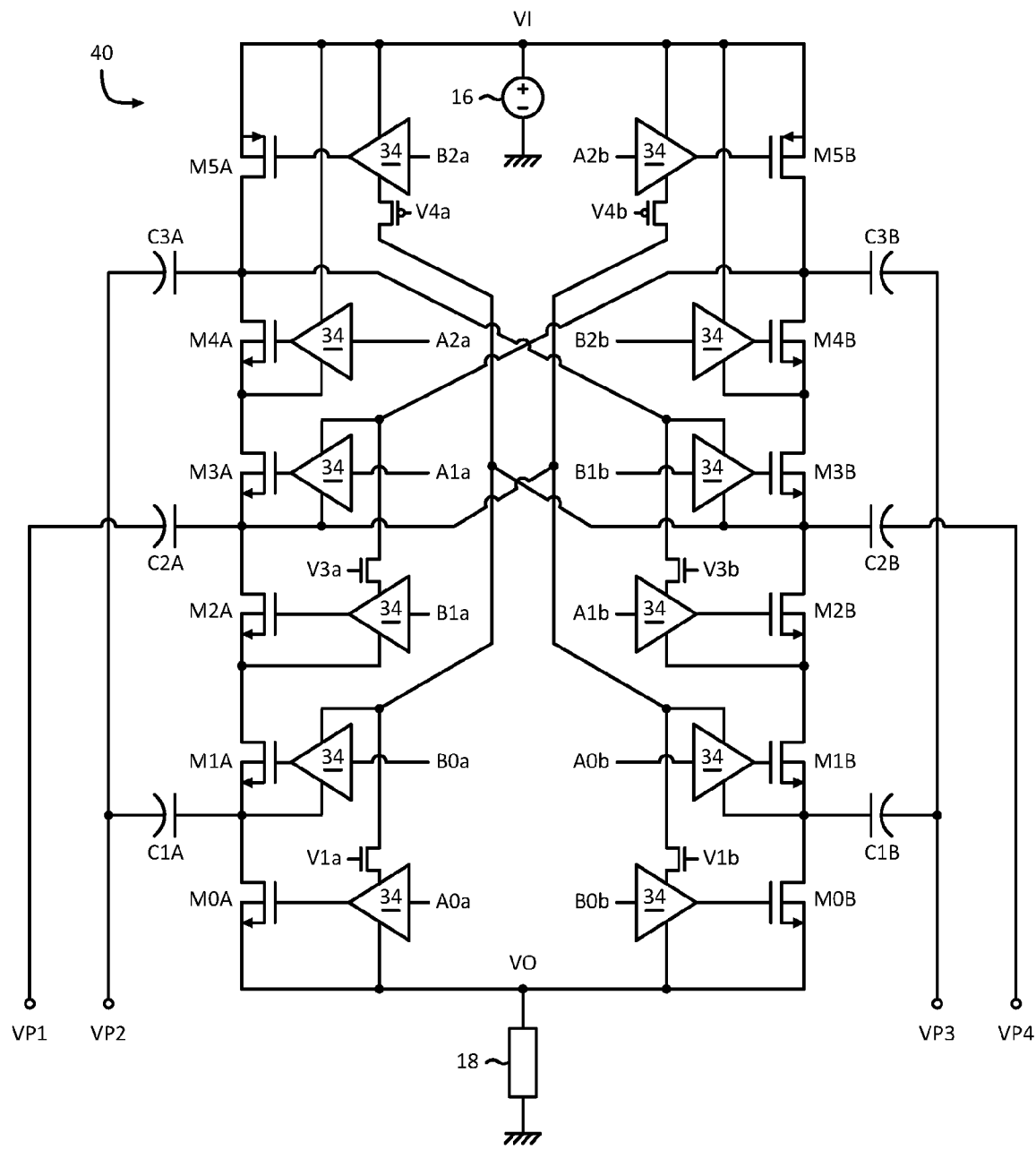
FIG. 8 is a schematic of a dual-phase cascade multiplier with cascoded switches and corresponding gate drivers.

In general, a single-phase cascade multiplier can be converted into a multi-phase cascade multiplier featuring multiple charge transfer paths that are shifted in time. As illustrated in FIG. 8, a dual-phase cascade-multiplier circuit 40 can be constructed by placing two copies, of the single-phase cascade-multiplier circuit 30 in parallel. Each copy is referred to as a phase (not to be confused with state). Therefore, the cascade-multiplier circuit 30 features a first phase and a second phase. The first phase includes capacitors C1A-C3A, transistors M0A-M5A, and phase voltages VP1, VP2. The second phase includes capacitors C1B-C3B, transistors M0B-M5B, and phase voltages VP3, VP4. Each of the transistors M0A-M5B has a corresponding gate driver circuit 34 that receives a driver signal with a label either beginning with an "A" or a "B." The first phase includes driver signals A0a-B2a while the second phase includes driver signals A0b-B2b.

The control signals of the first phase and the second phase are shifted by one-hundred and eighty degrees. This can be achieved by swapping the "A" and "B" signals in one of the two phases and then inverting the corresponding phase voltages. For example, in normal operation, the phase voltages VP1, VP3 are high when the phase voltages VP2, VP4 are low and vice versa. Furthermore, the voltage followers in the first phase receive bias voltages V1a-V4a while the voltage followers in the second phase receive bias voltage V1b-V4b. As in the previous single-phase example, a control circuit (not shown in FIG. 8) can generate the drivers signals A0a-B2b and the bias voltages V1a-V4b.

Additionally, by having the source 16 and the load 18 trade places, a step-down power converter can be converted into a step-up converter and vice versa. Therefore, the cascade-multiplier circuit 40 is step-down power converter instead of a step-up power converter as in FIG. 3.

There are several benefits of a dual-phase construction over a single-phase construction. The most obvious benefit is that there is always a charge transfer path between the source 16 and the load 18 regardless of the state of operation (first or second). A less obvious benefit is that the one phase can derive energy from an alternate phase to power circuitry and vice versa. Furthermore, this technique allows the cascade-multiplier circuit 40 to only use low-voltage gate driver circuits 34.

Figure 9:
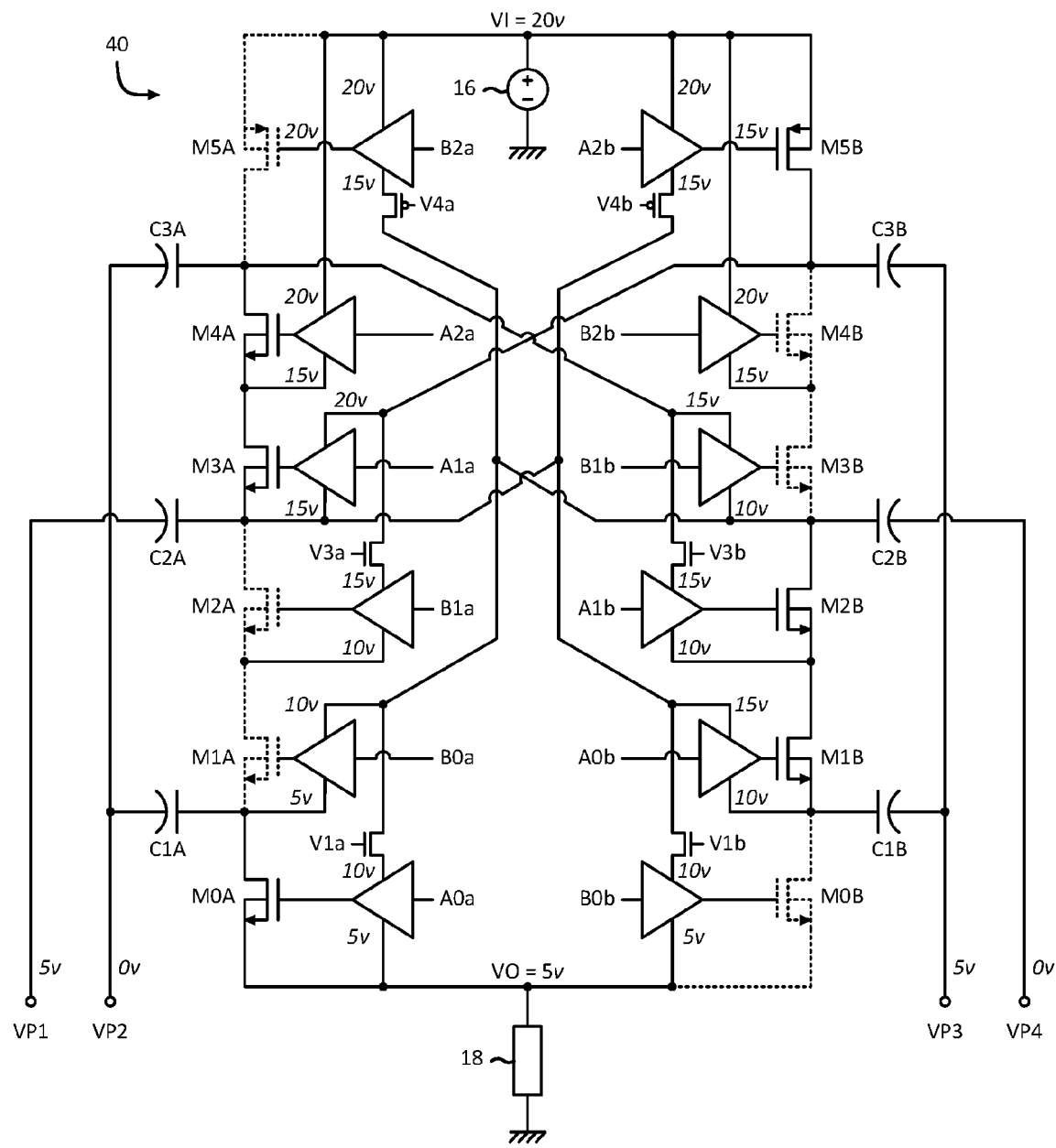
FIG. 9 is an annotated schematic of the circuit of FIG. 8 in one of two phases of operation.

Since a dual-phase converter is essentially two single-phase converters operated in parallel, the cascade-multiplier circuit 40 operates as described in connection with FIGS. 3-5. Assuming the input voltage VI is twenty volts, the resulting voltage levels powering the gate driving circuits can be understood with reference to FIG. 9 that show one state of operation. The other state of operation is not shown because it is simply a mirror image of the state shown in FIG. 9.

In the cascade-multiplier circuit 40, the transistors M0A-M3B derive power from opposing phases while the transistors M4A-M5B derive power from the input voltage VI. Powering the gate drivers from a parallel charge transfer path (i.e. opposing phase) results in one less voltage follower per phase. The voltage followers do not consume power. This is because the transistors M0A, M2A, M5A, M0B, M2B, M5B are de-activated while voltage is being dropped across their corresponding voltage followers. Because of the more efficient voltage followers and the lack of high-voltage gate driver circuits 35, the energy required to drive the gates in a dual-phase design is less than that that would be required by a single-phase design.

As in the single-phase construction of FIG. 3, it takes two full clock cycles for the initial charge into the cascade-multiplier circuit 40 to reach the load 18. However, in the dual-phase construction, there are two charge transfer paths between the source 16 and the load 18, instead of one, as in the single-phase construction. Furthermore, the two distinct charge transfer paths are shifted in time with respect to each other.

For example, a first unit of charge from the source 16 enters a first charge transfer path at the input of the cascade-multiplier circuit 40. During each state transition, the first unit of charge hops between the positive terminals of the capacitors C3B, C2B, C1B, in that order. As a result, the first unit of charge reaches the load 18 after four state transitions. Similarly, in a second charge transfer path, a second unit of charge leaves the source 16 and then hops between the positive terminals of the capacitors C3B, C2B, C1B with each state transition. The fourth state transition then delivers the second unit of charge to the load 18. Shifting the first and second charge transfer paths one hundred and eighty out of phase thus ensures that charge path always exists between the source 16 and the load 18.

The above described dual-phase cascade-multiplier circuit 40 is one of many different implementations.

Figure 10:
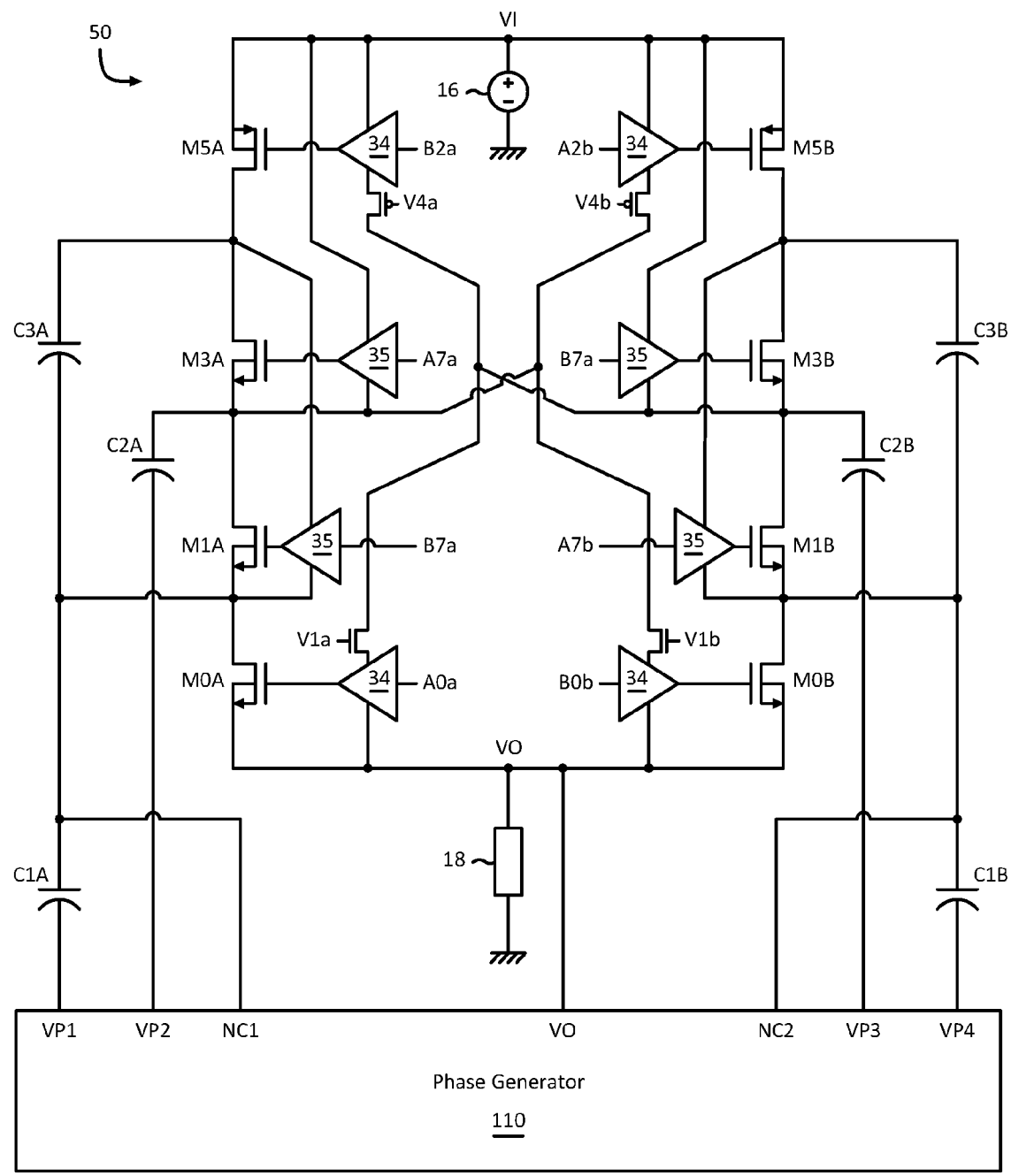
FIG. 10 is a schematic of a dual-phase cascade multiplier and corresponding gate drivers.

For example, FIG. 10 illustrates an alternative dual-phase cascade-multiplier circuit 50, formed by removing the cascode switches M2A, M4A, M2B, M4B in the cascade-multiplier circuit 40. This reduces control complexity and improves robustness. A disadvantage of this circuit is that, without the cascode switches, all of the inner switches M1A, M3A, M1B, M3B need to support twice the output voltage VO as well as their corresponding gate drivers 35.

Additionally, the pump capacitors C3A, C3B in the cascade-multiplier circuit 50 are pumped in series with their corresponding pump capacitors C1A, C1B, compared to being pumped in parallel as in the cascade-multiplier circuit 40. The series arrangement reduces the voltage across the pump capacitors C3A, C3B. For example, if the output voltage VO is five volts, then the voltage across the capacitors C3A, C3B is ten volts in FIG. 10 compared to fifteen volts in FIG. 8. Due to the similarity between the cascade-multiplier circuit s 40, 50, the cascade-multiplier circuit 50 operates as described in connection with FIG. 10

4. Phase Generation

Figure 11:
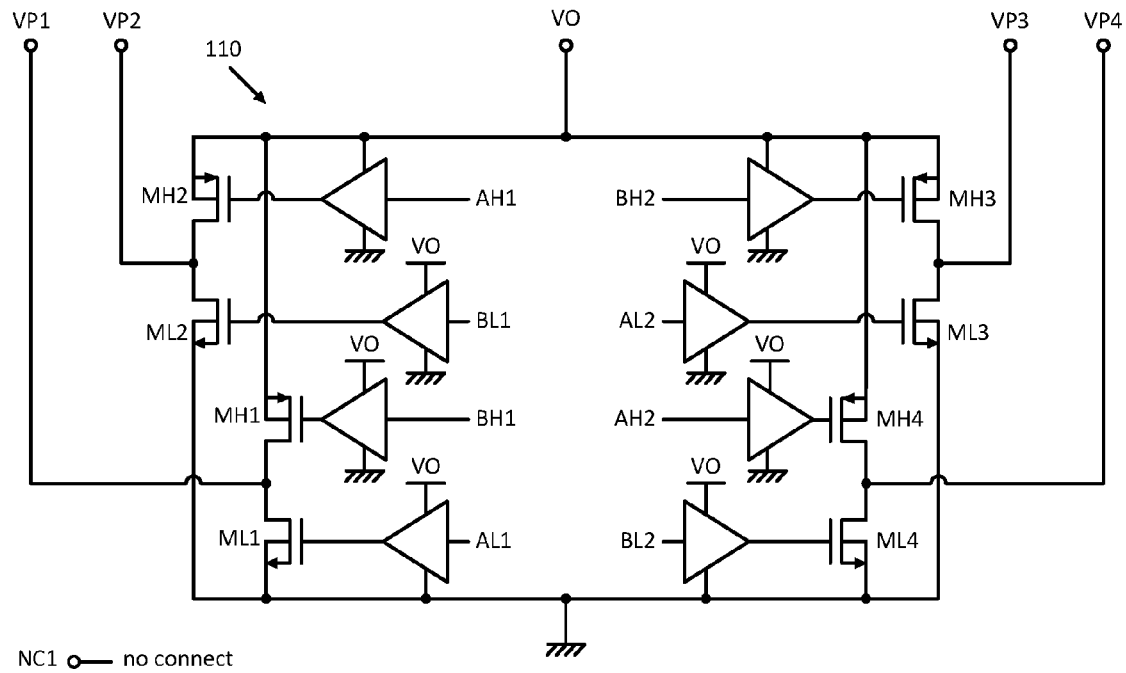
FIGS. 11-12 are schematics of two alternative phase generators for use with the circuit of FIG. 10.
Figure 12:
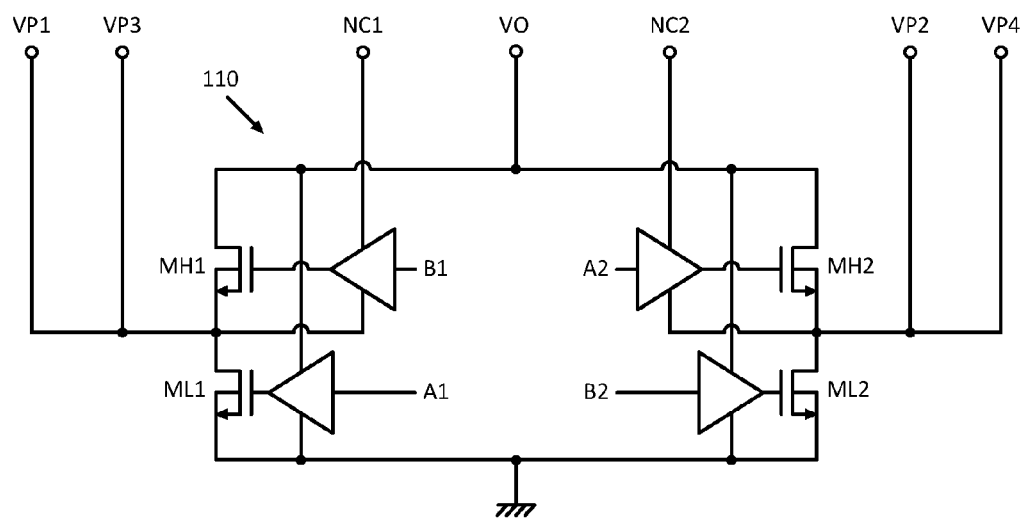

In addition to efficient generation of gate driving signals, the capacitor voltages can also be used to efficiently drive the phase signals that drive the capacitors. Two examples of the phase generator 110 are shown in FIGS. 11-12. These are suitable for using with the dual-phase cascade-multiplier circuit 50 shown in FIG. 10.

FIG. 11 illustrates a phase generator 110 that receives an output voltage VO and produces first, second, third, and fourth phase voltages VP1-VP4. The first and second phase voltages VP1, VP2 correspond to the first phase of the cascade-multiplier circuit 50 while the third and fourth phase voltages VP3, VP4 correspond to the second phase of the cascade-multiplier circuit 50.

The phase generator 110 features four transistor pairs. Each transistor pair generates one of the phase voltages VP1-VP4. A first pair of transistors MH1, ML1 generates the first phase voltage VP1; a second pair of transistors MH2, ML2 generates the second phase voltage VP2; a third pair of transistors MH3, ML3 generates the third phase voltage VP3; and a fourth pair of transistors MH4, ML4 generates the fourth phase voltage VP4. In each transistor pair, the high-side transistor (e.g. MH1) is a PMOS device while the low-side transistor (e.g. ML1) is an NMOS device.

Separate gate driver circuits control each transistor in the phase generator 110, thereby allowing tri-state operation of each transistor pair. The output voltage VO powers each gate-driver circuit. The gate-driver circuits can be implemented using numerous circuit topologies, such as the tapered gate driver illustrated in FIG. 6. Each gate driver circuit receives a driver signal with a label beginning with either an "A" or a "B." The driver signals AL1, BL1, AL2, BL2 control low-side transistors ML1, ML2, ML3, ML4, respectively while the driver signals BH1, AH1, BH2, AH2 control high-side transistors MH1, MH2, MH3, MH4, respectively.

In normal operation, the phase generator 110 cycles between a first state and a second state at a specific frequency. During the first state, the gate-driver circuits that receive a "B" signal activate their corresponding transistors and the gate-driver circuits that receive an "A" signal de-activate their corresponding transistors. Consequently, the first and third phase voltages VP1, VP3 are equal to the output voltage VO while the second and fourth phase voltages VP2, VP4 are equal to zero volts.

In contrast, during the second state, the gate-driver circuits that receive a "B" signal de-activate their corresponding transistors and the gate-driver circuits that receive an "A" signal activate their corresponding transistors. Consequently, the first and third phase voltages VP1, VP3 are equal to zero volts while the second and fourth phase voltages VP2, VP4 are equal to the output voltage VO.

FIG. 12 illustrates an alternative phase generator 110 that receives an output voltage VO and produces first, second, third, and fourth phase voltages VP1-VP4. In a dual-phase design, the first and third phase voltages VP1, VP3 are in phase; and the second and fourth phase voltages VP2, VP2 are in phase. Consequently, as illustrated in FIG. 12, the first and third phase voltages VP1, VP3 can be shorted together and the second and fourth phase voltages VP2, VP4 can be shorted together.

Additionally, high-side transistors MH1, MH2 can utilize NMOS transistors instead of PMOS transistors as in FIG. 11. The higher mobility of electrons in NMOS transistors allows the use of smaller high-side transistors MH1, MH2, thereby reducing the energy required to activate. Because NMOS transistors require a gate voltage higher than their source to activate, the high-side transistors MH1, MH2 derive this boost voltage from the pump capacitors within the cascade multiplier that the phase generator 110 is driving.

For example, if the phase generator 110 is coupled to the cascade-multiplier circuit 50, then the gate driver of the high-side transistor MH1 is coupled to the positive terminal of the pump capacitor C1A from the first phase. In contrast, the gate driver of the high-side transistor MH2 is coupled to the positive terminal of the pump capacitor C1B from the second phase. Therefore, each gate driver and its corresponding high-side transistor is powered by a pump capacitor from a distinct parallel charge transfer path.

Because of the similarity of the phase generators 110 in FIGS. 11-12, the phase generator 110 in FIG. 12 operates as described in connection with FIG. 11. The differences mainly arise from the shorted phase voltages and boosted high-side transistors MH1, MH2

5. Alternatives

Figure 13:
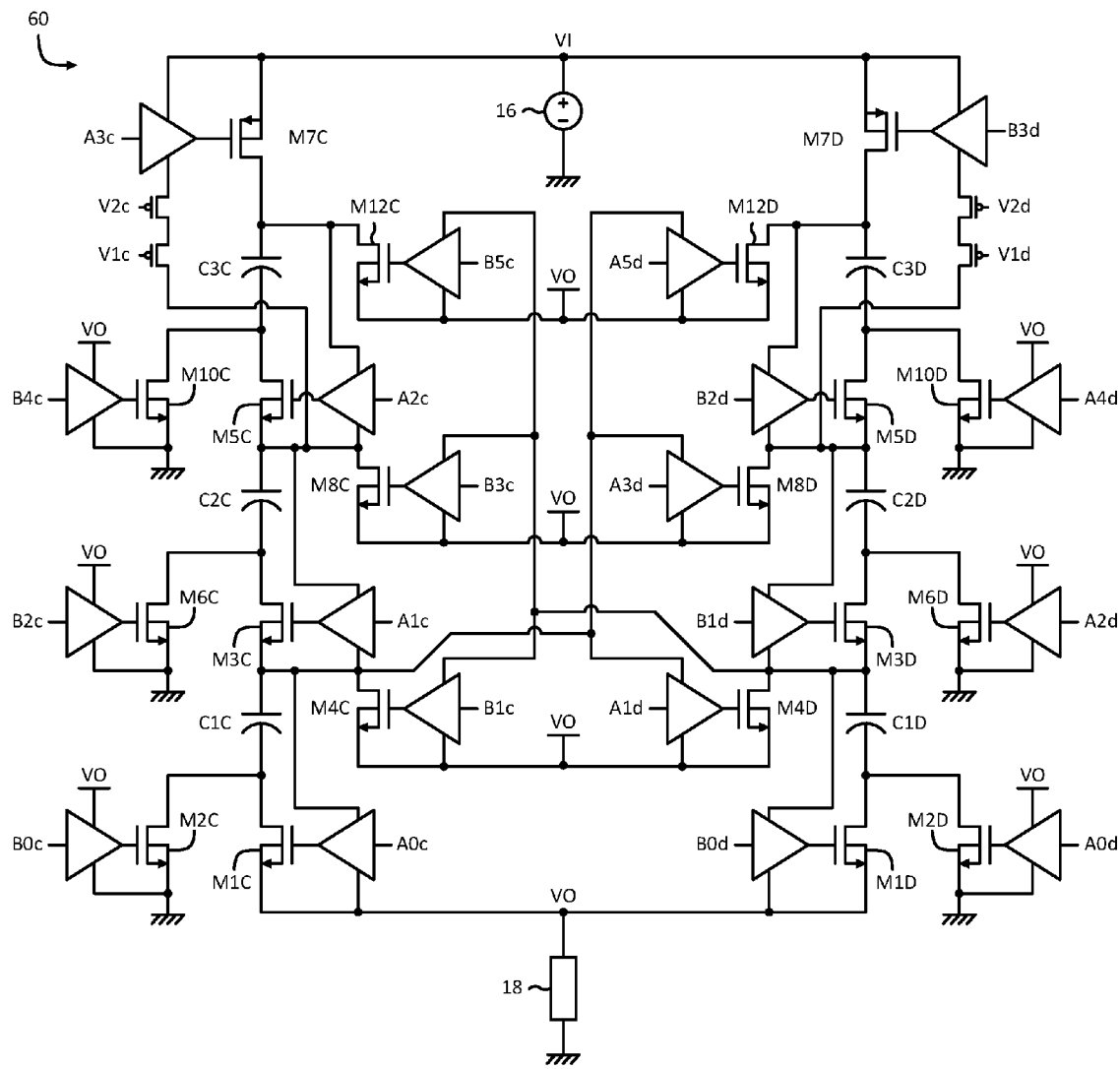
FIG. 13 is a schematic of a dual-phase series-parallel switched capacitor converter and corresponding gate drivers.

A number of alternatives to the switched-capacitor power-converter designs discussed make use of the approaches embodied in those designs. For example, the converter illustrated in FIG. 13 is a dual-phase series-parallel switched capacitor circuit 60 that includes some gate drivers that are powered by capacitors in either the same charge transfer path or a parallel charge transfer path.

The switched capacitor circuit 60 includes a pair of phases. A first phase includes capacitors C1C-C3C, odd-numbered transistors M1C-M7C, and even-numbered transistors M2C-M12C. Similarly, a second phase includes capacitors C1D-C3D, odd-numbered transistors M1D-M7D, and even-numbered transistors M2D-M12D. All of the transistors coupled with signals having an "A" prefix through corresponding gate drivers are activated and de-activated at the same time; as is the case for all of the transistors coupled with signals having a "B" prefix through corresponding gate drivers.

The switched capacitor circuit 60 produces an output voltage VO that is four times lower than an input voltage VI. It does so by cycling between a first state and a second state at a specific frequency. During the first state, the first phase odd-numbered transistors M1C-M7C and the second phase even-numbered transistors M2D-M12D are activated while the first phase even-numbered transistors M2C-M12C and the second phase odd-numbered transistors M1D-M7D are de-activated. This switch activation pattern places the second phase capacitors C1D-C3D in parallel with the load 18 and places a series arrangement of the first phase capacitors C1C-C3C in between the source 16 and the load 18.

In contrast, during the second state, the first phase odd-numbered transistors M1C-M7C and the second phase even-numbered transistors M2D-M12D are de-activated while the first phase even-numbered transistors M2C-M12C and the second phase odd-numbered transistors M1D-M7D are activated. This switch activation pattern places the first phase capacitors C1C-C3C in parallel with the load 18 and places a series arrangement of the second phase capacitors C1D-C3D in between the source 16 and the load 18.

Unlike either of the dual-phase cascade-multiplier circuits 40 or 50, within a single phase of the switched capacitor circuit 60, the gate drivers derive their power from capacitors in both phases. For example, the gate drivers for the corresponding transistors M1C, M3C, M5C are powered from the capacitors C1C, C2C, C3C, respectively while the gate drivers for the corresponding transistors M4C, M8C, M12C are powered from the capacitor C1D.

Furthermore, the voltage stress across the transistors in a series-parallel switched capacitor power converter can be higher than the corresponding voltage stresses in cascade multipliers. Assuming a twenty-volt input voltage VI, the maximum voltage across the transistors M12C, M12D will be fifteen volts. In this embodiment, the gate-to-source voltage is always five volts and the gate drivers for the top PMOS transistors require two series connected voltage followers that are biased using voltages V1$c$-V2$d$.

Although described in the context of single-phase and dual-phase converters, it should be understood that other multi-phase converter configurations can be used. For example, a four-phase cascade multiplier can be constructed by placing two copies of the cascade-multiplier circuit 40 in parallel and shifting their respective clocks by ninety degrees. Adding an even number of phases is straightforward because every subsequent pair of phases can be run in isolation.

However, if the switched capacitor power converter includes an odd number of phases, it is more difficult to power gate drivers from capacitors in different parallel charge transfer paths. In this case, each gate driver draws power from capacitors in multiple parallel charge-transfer path instead of from a single parallel charge transfer-path in the even-numbered phase case.

In general, switched capacitor converters feature a large number of switches and capacitors. By necessity, at least a few of the switches float. This means that neither switch terminal is attached to a constant electric potential. Switched-capacitor converters that have at least one floating switch can benefit by deriving power from the same charge transfer path or a parallel charge transfer path. Examples of such switched capacitor converters include those having cascade multiplier, series-parallel, parallel-series, Fibonacci, and voltage-doubler topologies.

6. Implementations

The switched capacitor power converters and the associated gate drivers illustrated herein can all be integrated on one or multiple semiconductor substrates. If all of the transistors are integrated on a single substrate and if any of those transistors float, then the transistors must be isolated from the substrate. For example, in a CMOS process, NMOS transistors are typically formed in a p-type substrate. These devices can only float if the bulk of the NMOS transistors is isolated from the substrate. If this were not the case, then an alternative possibility would be to use multiple semiconductor substrates.

The capacitors in a switched capacitor power converter can either be integrated, discrete, or a combination thereof. The discrete capacitors are typically multi-layer ceramic capacitors. The integrated capacitors are typically planar or trench capacitors. If the capacitors are integrated, then they can be integrated on the same wafer with their switches, on a separate wafer, or on a combination thereof. Furthermore, if the capacitors and switches are on different wafers then there are various attachment methods, some of which remove the pin count limitation of the overall converter.

The ability to re-purpose the pump capacitors is of benefit when the switched capacitor power converter uses either integrated capacitors or discrete capacitors. If discrete capacitors are used, then each capacitor uses at least one pin. Adding extra pins for the gate driver circuitry is quite painful because pins on an integrated circuit are of limited supply for a given die area. On the other hand, integrated capacitors do not eat into your pin count, but they are quite expensive and have a low capacitance per area so it is valuable to limit their use.

Typically, a controller produces control signals for activating and de-activating the switches within a switched capacitor power converter. For example, in most of the embodiments described above, a controller could have generated the driver signals that are labeled with an "A" or a "B" prefix. By controlling the on and off time of the individual switches, a controller can provide many functions. A few such functions include the ability to regulate the output voltage, the ability to shut off the power converter in the event of a fault condition, and the ability to change the gain of the switched capacitor network.

Various features, aspects, and embodiments of switched capacitor power converters have been described herein. The features, aspects, and numerous embodiments described are susceptible to combination with one another as well as to variation and modification, as will be understood by those having ordinary skill in the art. The present disclosure should, therefore, be considered to encompass such combinations, variations, and modifications. Additionally, the terms and expressions which have been employed herein are used as terms of description and not of limitation. There is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

It is to be understood that the foregoing description is intended to illustrate and not to limit the scope of the invention, which is defined by the scope of the appended claims. Other embodiments are within the scope of the following claims.

What is claimed is:

1. An apparatus for power conversion, said apparatus comprising a pre-charge circuit, switches, and gate-driver circuits, wherein said switches comprise active semiconductor switch elements, wherein said switches are configured to transition between first and second states that result in corresponding first and second electrical interconnections between capacitors and at least one of first and second terminals, wherein said first terminal is configured to couple to a first external circuit at a first voltage, wherein said second terminal is configured to couple to a second voltage that has a magnitude that is less than that of said first voltage, wherein said pre-charge circuit is coupled to at least one of said capacitors, wherein each gate-driver circuit comprises a control input, power connections, and a drive output, wherein each switch is coupled to and controlled by a drive output of one of said gate-driver circuits, wherein said gate-driver circuits comprise a first gate-driver circuit, and wherein said first gate-driver circuit receives power via a power connection thereof from at least one of said capacitors.

2. The apparatus of claim 1, wherein said pre-charge circuit is configured to initialize voltages on capacitors in said switched-capacitor network prior to clocked operation of a switched-capacitor network defined by said capacitors and said switches.

3. The apparatus of claim 1, wherein said pre-charge circuit is configured to maintain source voltages across selected switches within a required limit during startup of operation of said apparatus.

4. The apparatus of claim 1, wherein said pre-charge circuit is configured to provide charge to one or more of said capacitors to be used to power said gate driving circuits upon beginning clocked operation of said apparatus.

5. The apparatus of claim 1, wherein said pre-charge circuit comprises bias resistors, said bias resistors defining a resistor divider that defines a pre-charge voltage for one or more of said capacitors during startup of operation of said apparatus, resistances of said resistors being selected to avoid exposing said switches to voltages in excess of a threshold voltage, thereby avoiding damage to said switches during startup of operation of said apparatus.

6. The apparatus of claim 1, further comprising terminals coupled to said switches for connecting to said capacitors.

7. The apparatus of claim 1, wherein said switches and said capacitors define a power converter that is configured to provide time-varying voltages to at least some of said gate-driver circuits.

8. The apparatus of claim 1, wherein each of said switches has a maximum-voltage rating that is less than said first voltage.

9. The apparatus of claim 1, wherein said voltage across said power connections of said first gate-driver circuit is no greater than twice said second voltage and less than said first voltage.

10. The apparatus of claim 1, wherein each switch is driven by a corresponding one of said gate-driver circuits, said apparatus further comprising a second gate-driver circuit, wherein said second gate-driver circuit receives power via a power connection thereof from at least another of said capacitors, wherein, in operation, said at least another of said capacitors has a voltage that differs from that across said at least one of said capacitors, which drives said first gate-driver circuit.

11. The apparatus of claim 1, wherein each capacitor in said at least some capacitors comprises a first terminal and a second terminal, wherein, during operation of said apparatus, said first terminal is at a higher voltage than said second terminal, wherein said at least some capacitors comprise a first capacitor and a second capacitor, and wherein at least one of said switches connects a first terminal of said first capacitor to a first terminal of said second capacitor.

12. The apparatus of claim 11, wherein said second terminal of said first capacitor is connected to a first phase voltage, wherein said second terminal of said second capacitor is connected to a second phase voltage, and wherein said first phase voltage is different from said second phase voltage.

13. The apparatus of claim 1, wherein each capacitor has a first terminal and a second terminal, wherein, during operation of said apparatus, said first terminal is at a higher voltage than said second terminal, and wherein said switches connect said first terminals to each other.

14. The apparatus of claim 1, wherein said first gate-driver circuit is configured to cause a voltage across said power connections thereof to be less than said first voltage.

15. An apparatus for converting voltage, said apparatus comprising a pre-charge circuit, terminals, gate-driver circuits, switches, and a switched-capacitor converter, wherein said terminals are configured for coupling to corresponding external circuits at corresponding voltages, wherein said switches comprise active semiconducting-elements that electrically interconnect capacitors to form a switched-capacitor network that is configured to transition between successive states, wherein at least one of said capacitors is coupled to said pre-charge circuit, wherein said switches electrically interconnect said capacitors in said successive states to one another and to said terminals, wherein each gate-driver circuit comprises a drive output, power connections, and a control input, wherein each drive output is coupled to and controls one of said switches, wherein said gate-driver circuits comprise a first gate-driver circuit that controls a switch element, wherein said first gate-driver circuit is powered via said power connections thereof by charge stored on at least one of said capacitors, and wherein said terminals and said switches are constituents of said switched-capacitor converter.

16. The apparatus of claim 15, wherein said terminals comprise capacitor terminals coupled to corresponding ones of said switches for connecting to said capacitors.

17. The apparatus of claim 15, wherein said switched-capacitor converter is configured to provide, to at least some of said gate-driver circuits, time-varying voltages relative to a lowest of said corresponding voltages.

18. The apparatus of claim 15, wherein each switch element has a maximum voltage rating that is less than a highest of said corresponding voltages.

19. The apparatus of claim 18, wherein said gate-driver circuits comprise a first gate-driver circuit, wherein said first gate-driver circuit comprises first and second power connections, wherein, in operation, a voltage difference exists across said first and second power connections, wherein said voltage difference arises at least in part from a capacitor that is connected to said first power connection, wherein said voltage difference is less than or equal to a particular voltage, wherein said particular voltage is less than or substantially equal to twice a lowest of said corresponding voltages.

20. The apparatus of claim 15, wherein said gate-driver circuits comprise a first gate-driver circuit and a second gate-driver circuit, wherein said switches comprise a first switch-element and a second switch-element, wherein said first switch-element is driven by said first gate-driver circuit, wherein said first gate-driver circuit is configured to be powered by a first capacitor that has a first voltage, wherein said second switch-element is driven by said second gate-driver circuit, wherein said second gate-driver circuit is configured to be powered by a second capacitor that has a second voltage, and wherein said first voltage is different from said second voltage.

21. The apparatus of claim 15, further comprising a phase generator, wherein said phase generator comprises phase-generator switches, wherein said phase generator is configured to provide a time-varying voltage level to one terminal of each of said capacitors, wherein said phase generator is configured to generate a voltage level for a capacitor in a first charge-transfer path using a voltage from a capacitor in a second charge-transfer path.

22. The apparatus of claim 15, wherein said switches comprise a first switch element and a second switch element, wherein said second switch element is in series with said first switch element, wherein, in operation, said first and second switches transition into a state in which said first and second switches permit a steady flow of charge between capacitors.

23. The apparatus of claim 15, wherein each switch element has a maximum voltage rating that is less than a highest of said corresponding voltages.

24. The apparatus of claim 15, wherein said switched-capacitor converter comprises a cascade-multiplier network.

25. The apparatus of claim 15, wherein said switched-capacitor converter comprises a series-parallel switched-capacitor network.

26. The apparatus of claim 15, wherein said gate-driver circuits comprise a first gate-driver circuit, wherein said first gate-driver circuit is configured to be powered via power connections thereof from charge stored in a capacitor set such that a voltage across said power connections is substantially less than a particular voltage, wherein said particular voltage is a highest of said corresponding voltages.

27. The apparatus of claim 15, further comprising capacitors coupled to said switches, wherein connections between said capacitors are controlled by said switches.

28. A method for converting a first voltage into a second voltage, said method comprising connecting a first terminal of a switched-capacitor power converter to a first external circuit, said switched-capacitor power converter comprising a switched-capacitor network in which capacitors are selectively interconnected by active semiconductor-switches, connecting a second terminal of said switched-capacitor power converter to a second external circuit, before beginning normal operation of said switched-capacitor power converter, pre-charging at least one capacitor within said switched-capacitor power converter, providing first control-signals to control inputs of gate-driver circuitry of said power converter, wherein said first control-signals cause first drive-signals at corresponding drive-outputs of said gate-driver circuitry, wherein said first drive-signals cause said active semiconductor-switches to execute a first switch-activation pattern, providing second control-signals to control inputs of said gate-driver circuitry, wherein said second control-signals cause second drive-signals at corresponding drive-outputs of said gate-driver circuitry, wherein said second drive-signals cause said active semiconductor-switches to execute a second switch-activation pattern, and providing power to said gate-driver circuitry through power connections thereof, said power being provided by capacitors from said switched-capacitor network, wherein, in said first switch-activation pattern, a first series of active semiconductor-switches connect first and second capacitors in said switched-capacitor network of said power converter so as to permit conduction current to flow between high-voltage terminals of first and second capacitors, wherein providing said power comprises causing a voltage across said power connections to be less than a highest of said first and second voltages.

* * * * *